Feb. 19, 1929.

E. MacDONALD

JUICE EXTRACTOR

Filed March 19, 1927

1,702,737

Eleanor MacDonald
INVENTOR

BY Charles A. Clark
ATTORNEY

Patented Feb. 19, 1929.

1,702,737

UNITED STATES PATENT OFFICE.

ELEANOR MacDONALD, OF NEW YORK, N. Y.

JUICE EXTRACTOR.

Application filed March 19, 1927. Serial No. 176,741.

My invention relates to juice extractors and more particularly to extractors for use in the kitchen or for family use.

One object of my invention is to provide a juice extractor wherein all the pits and pulp are deposited in a strainer receptacle and the strained juice in a cup having a lip and a handle.

Another object of my invention is to provide a macerator in combination with a handled, lipped cup having a pivoted strainer integral therewith.

It is well known that juice extractors have been used and that strainers of various kinds have been used with the same but none of these utilize the unique combination of elements nor produce a result in any way comparable to the results produced by this device nor do any function in the same manner.

With these and other objects in view, my invention resides in the features of construction, arrangement of parts and method of operation which will hereinafter be fully disclosed in the specification and illustrated in the drawings, wherein like reference characters refer to similar parts throughout the several views, in which:—

Figure 3:
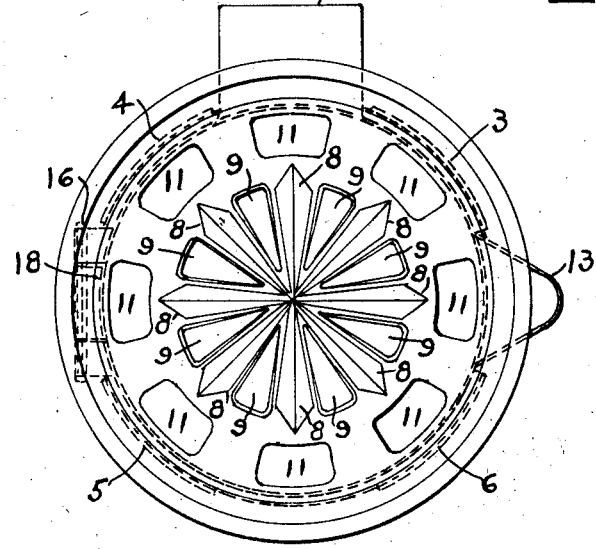
Figure 3, is a plan view of the device.

The macerator 1, is a dish shaped vessel with a rolled edge 2, and four portions 3, 4, 5 and 6, respectively, projecting below the horizontal plane of the macerator outside of the vessel 12, the parts 3 between 13 and 14, 4 between 14 and 18, 5 abutting 18 and 6 abutting 13, thus preventing any movement of the macerator when in place, as shown in Figure 3.

In the center of this macerator is a cone shaped projection 7, comprised of a series of macerating ribs 8, between which are relatively large openings 9, communicating with the interior of the cone.

Between the base of the cone shaped projection 7, and the sides 10 of the dish like portion are a series of relatively large openings 11.

The cup 12, provided with rounded corners 21, the lip 13, and handle 14, has a strainer 15, pivoted thereto by the pivot 16.

The strainer is made up of a frame 17, with a hinged portion 18, a rim 19, and a strainer 20, attached thereto.

Figure 1:
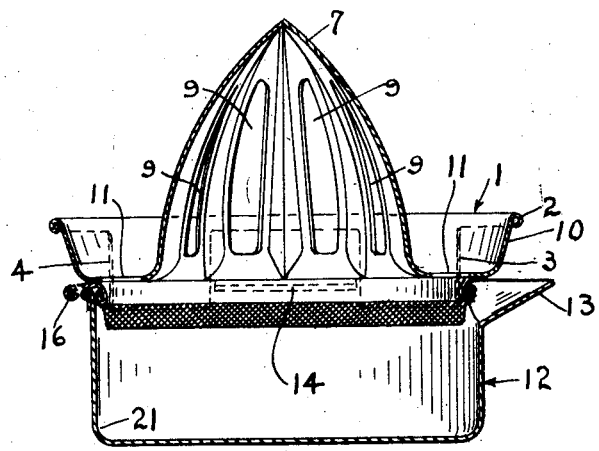
Figure 1, is a vertical section of the device.
Figure 2:
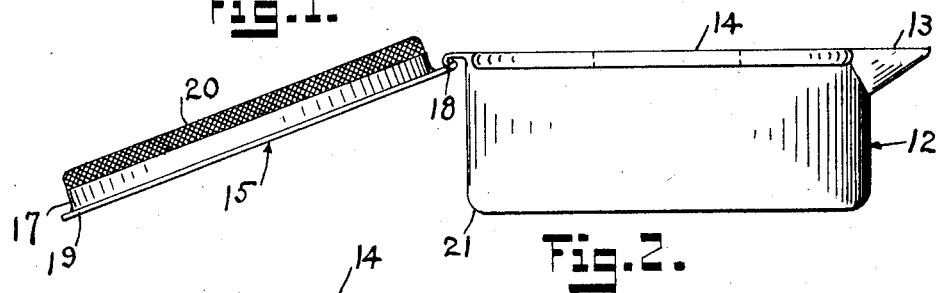
Figure 2, is a side elevation of the cup and strainer.

In operation the hinged strainer is placed in position as shown in Figure 1, the macerator, prevented from turning by the depending projections 3, 4, 5 and 6, which fits over the vessel 12 as shown, and the fruit, as for instance, a lemon, is cut in half and each half twisted over the macerating ribs of the macerator.

The juice, pits and pulp will pass through the holes 9 and 11, into the strainer, thereupon the juice will strain into the bottom of the cup.

The cup with its pivoted strainer and the macerator is lifted by the handle 14, and the juice poured off by the lip 13, into any other receptacle.

Then the macerator is lifted off the receptacle, and washed in running water, the strainer inverted over a waste or garbage pail and the pulp and pits are thrown away, after which the strainer and the receptacle can be washed in running water.

Having thus described and illustrated the preferred embodiment of my invention, I do not wish to limit myself to the exact construction shown, since it is evident that modifications may be made without departing from the spirit of the invention or scope of the claim.

I claim:—

The combination in a juice extractor of a strainer hinged to a vessel provided with a handle and lip and a macerator provided with depending projections adapted to fit over said vessel abutting the handle, lip and hinge thereof.

Signed at New York, this 23 day of March, A. D. 1927, in the county of New York and State of New York.

MRS. ELEANOR MACDONALD.